Patented Oct. 11, 1938

2,132,701

UNITED STATES PATENT OFFICE 2,132,701

SHORTENING AND METHOD OF BAKING THEREWITH

Albert S. Richardson, Herbert S. Coith, and Verling M. Votaw, Wyoming, Ohio, assignors to The Procter & Gamble Company, Cincinnati, Ohio, a corporation of Ohio No Drawing. Application February 3, 1938, Serial No. 188,583

10 Claims. (Cl. 99—123)

Our invention relates to semi-solid or plastic shortenings, such as lard and partially hydrogenated cottonseed oil, which are essentially intimate mixtures of liquid and solid fat. In particular, our invention relates to improved plastic shortenings containing combined glycerin in excess of that occurring in the ordinary triglycerides of fatty acids.

The present application is a continuation-in-part of our copending applications Serial Nos. 655,292–655,295, inclusive, filed February 4, 1933, and Serial Nos. 726,174 and 726,175, filed May 17, 1933.

The common commercial shortenings, like the natural fats and fatty oils entering into their composition, are essentially triglycerides, in which fatty acid and glycerin are combined in the ratio three mols to one mol. respectively. No known natural fat contains glycerin in substantially greater amount than one mol. to each three mols of total fatty acid. In distinction, synthetic fats are sometimes prepared not only in the form of triglyceride but also in the form of diglyceride and monoglyceride, and various mixtures thereof. Diglycerides contain one mol. of combined glycerin to each two mols of fatty acid, and monoglycerides contain glycerin and fatty acid combined in equimolecular proportion. Fats consisting of or containing appreciable proportions of monoglyceride or diglyceride or both are termed superglycerinated fats. Similarly designated for convenience herein are the polyglycerides, which may be prepared by incomplete esterification of the polyglycerols with fatty acid. Mono-, di-, and polyglycerides and mixtures thereof suitable for use in the practice of the instant invention may be defined as higher fatty acid esters of molecular formula containing a glycerol radical having therein at least one unesterified hydroxyl group.

The object of our present invention is to provide superglycerinated fat which is superior for use as shortening not only to the ordinary commercial fats heretofore available but also to superglycerinated fat compounded in accordance with the previous suggestions of others.

Prior to the present invention it has been proposed in a general way to add monoglycerides, diglycerides and polyglycerides to fatty oils to increase emulsifying power with respect to water. It has also been proposed to make a plastic shortening by stiffening fatty oils by the addition of synthetic hard fat comprising particularly the diglyceride of such fatty acids as palmitic and stearic.

Notwithstanding these proposals, all or practically all commercial edible fats and oils prior to the present invention have consisted essentially of triglyceride. The failure of edible fats containing monoglyceride, diglyceride and polyglycerides to come into practical use may be explained not only by the lack of knowledge of the true advantages of such fats, but also by the fact that in the prior art the specific formulas proposed for superglycerinated fats are defective from the standpoint of realizing this advantage in a practical way.

In making of sweet baked goods such as the usual forms of layer cake, sugar and the water commonly added with it impart to the finished product both desirable and undesirable properties. The resulting sweetness, moistness, and tenderness are highly prized, but these are attained in increasing degree at the expense of volume and light texture. Thus it has been found that an increase in the ratio of the amount of sugar used to that of flour is generally beneficial and improves the moistness and keeping qualities of the cake, but that the amount of sugar which may be used is limited by the increasing tendency of the cake to fall when a predetermined ratio of sugar to flour is exceeded. Under present practice with the use of ordinary shortenings, the amount of sugar in commercial cakes is on the average limited to less than the weight of flour present, notwithstanding the fact that more sugar and along with it more moisture would be advantageous from the standpoint of the desirable qualities of these ingredients. If, for instance, 50% more sugar than flour is used, the cake made with ordinary triglyceride shortening has a poor texture and is deficient in volume, if not a complete failure, and such a cake is said to be "sad".

On the other hand, cakes made with the use of the superglycerinated shortening described in the present invention may contain as much as 150% or even 175% sugar (on the basis of flour), and the proportion of milk or other liquid constituents may also be increased, without making the cake "sad". The result is a light, tender cake, unusually sweet and moist and resistant to the development of staleness. The cost of the cake made thus with our shortening is at the same time reduced on account of the relatively greater proportion of sugar and moisture present.

While it is our purpose to provide shortening improved particularly for use in sweet baked goods, our shortening also gives improved results with respect to a light, tender texture when it is used in other classes of cooked products, such as waffles, pancakes, and biscuit, also bread, rolls and the like baked from yeast-raised doughs.

In baking practice experience has shown that plastic fat is superior for general use as a shortening agent to liquid or truly solid fat. By plastic fat we mean, of course, an intimate mixture of solid and liquid fat which is of plastic consistency in the range of temperature at which it is intended for use. As in the case of triglyceride fats, we have found that not invariably but on the average better results are obtained with the use of superglycerinated fat in baked products when the main body of shortening is plastic; that is particularly true in cake baking, for which the shortening disclosed and claimed in the present application is remarkably effective.

In our above mentioned co-pending applications, Serial Nos. 655,292, 655,293 and 726,175, we have disclosed and claimed certain classes of superglycerinated shortening which we have found to be outstandingly useful in bakery practice, these three applications dealing for the most part with combinations of shortening material in which triglyceride predominates. Plastic shortening in which monoglyceride predominates can produce even more striking results as compared with conventional triglyceride shortening and is particularly useful in the making of cakes and other baked products containing less than the usual proportion of shortening.

Aside from such non-essential ingredients like emulsified water or flavoring agents as may be present, the shortening made according to the present invention may be described as a plastic mixture of liquid and solid fatty esters consisting principally of mono-, di-, and/or polyglycerides. We have found that the liquid or soft superglycerinated fats are on the whole more effective in the improvement of baked products than the solid superglycerinated fats, being especially superior to the high melting diglycerides. For this reason, also because plastic consistency is not easily attained in fat mixtures where solid fat predominates, our mono-, di-, and polyglycerides should be prepared mainly from fats or fatty acids of relatively low melting point. Fatty acids of naturally soft or liquid fats are mostly unsaturated, the chief exceptions being coconut and palm kernel oils. Since the last named oils yield superglycerinated fats of objectionable flavor, we preferably use no substantial amount of oils of the coconut type and we find it necessary to prepare our improved shortening principally from oils and fats containing fatty acids which are predominantly unsaturated and of 16 or higher carbon content.

The required fatty esters may, for instance, be prepared by reacting glycerin or polyglycerol with animal fats such as lard or beef tallow, unsaturated vegetable oils such as cottonseed, sesame, peanut, palm or soybean oils, with or without partial hydrogenation of the oil, or from partially hydrogenated marine oils. Even a certain amount of oil of the coconut oil type is not objectionable. Similarly free fatty acids may be prepared from any of these oils and esterified with the proper proportion of glycerin or polyglycerol.

The proportion of the combined glycerin in the superglycerinated fat should be at least about 14%, and should be greater if the product is to be blended with triglyceride fat in order to obtain the correct consistency.

Three general methods are in common use for obtaining the balance of solid and liquid fats to impart the proper plasticity to a finished shortening. The simplest method is merely the selection of a natural fat that happens to be of suitable composition and consistency, e. g., lard or butter fat. A second method, almost equally simple and better suited to positive control, is to blend together two or more fats of varying melting points and consistency. A third general method is to alter the consistency of a given fat by some treatment that changes the proportion of liquid and solid constituents in the finished shortening. This alteration is usually effected by partially hydrogenating a liquid or very soft fat, thereby decreasing the proportion of liquid fat without by any means making the whole shortening a true solid under the conditions of its manufacture and use. Fats may also be processed to suitable plastic consistency by graining, i. e. by fractional crystallization to remove excess of solid from a hard fat or excess of liquid from a soft fat, but this method of processing is more often used commercially for the purpose of making hard fats or liquid fats rather than plastic fats. Any of these methods may be adapted to the control of the composition of the shortening of the present invention in order that it may be prepared in plastic form.

It so happens that, if a fat is of composition suitable for preparing it in plastic form, the same fat after reaction with glycerin is without other change in composition usually suitable for preparation into plastic shortening. Thus lard may be converted into a mono- and diglyceride mixture and immediately rendered plastic by proper cooling. Similarly cottonseed oil may be hydrogenated to about the same iodine value which would be suitable for preparing plastic triglyceride shortening and subsequently reacted with glycerin to form a superglycerinated fat of, for example, 19% combined glycerin, and this superglycerinated fat then plasticized in the conventional manner. Alternatively, the original cottonseed oil might be superglycerinated to the same extent and blended with about 10% of either hard superglycerinated fat or tristearin and rendered plastic by proper cooling. On the whole, superglycerination tends to yield a fat which in the plastic form sets up to a slightly stiffer fat on standing in the package but breaks down on stirring somewhat more easily than the corresponding triglyceride fat. Obviously hard superglycerinated fat cannot be relied upon to furnish the larger part of the component fats in our shortening without tending to render same too stiff for convenient mixing.

The method of treating the superglycerinated fat mixture in order to render it plastic does not constitute a part of the present invention. In the extreme case, it is sufficient merely to allow the mixture to cool in the shortening container, with spontaneous formation of a plastic mix. We prefer in general to melt together all the ingredients of the shortening and simultaneously or immediately thereafter cool rapidly and vigorously agitate in order to form the proper amount of solid fat in intimate mixture with the liquid fat.

The following are examples of the composition of shortening made according to the present invention, it being understood in all cases that the fat mixture as preared for use is plastic.

*Example 1.*—Cottonseed oil hydrogenated to 66 iodine value and reacted with glycerin until the average composition corresponds to diglyceride.

Example 2.—The mixed monoglycerides of the fatty acids of cottonseed oil hydrogenated to 66 iodine value.

Example 3.—Cottonseed oil hydrogenated to 60 iodine value and superglycerinated to a combined glycerin content between 15% and 16%.

Example 4.—Monoglyceride of lard.

Example 5.—A mixture of glycerides containing about 19% combined glycerin prepared from fatty acids of peanut oil hydrogenated to 80 iodine value.

Example 6.—Mixed monoglyceride and diglyceride of hydrogenated peanut oil of 68 iodine value containing 20% combined glycerin.

Example 7.—Diglyceride of hydrogenated sesame oil of 70 iodine value.

Example 8.—Diglyceride of hydrogenated peanut oil of 60 iodine value.

Example 9.—Glycerides of hydrogenated cottonseed oil of 65 iodine value containing 23% combined glycerin.

Example 10.—Superglycerinated hydrogenated cottonseed oil of 65 iodine value containing 18% combined glycerin.

Example 11.—(Especially suited for use at lower than average room temperature.) Superglycerinated cottonseed oil, unhydrogenated, containing approximately 18% combined glycerin.

Exampe 12.—Esterification product of equimolar mixture of diglycerol and fatty acids of hydrogenated cottonseed oil of 70 iodine value.

Various mixtures of the compounds specified in the foregoing examples afford satisfactory results, as well as mixtures of these compounds with smaller quantities of ordinary triglyceride shortening. The highly superglycerinated plastic fat of the present invention is especially useful in order to obtain tender texture in baked products containing a relatively small proportion of shortening, for example, in many formulas for bread and rolls. It is also useful for improving the volume of cakes containing an unusually large proportion of sugar and aqueous ingredients, either alone or in combination with ordinary triglyceride shortening.

Numerous examples of the manner in which shortening of the kind described and claimed herein can be advantageously employed will be found in our co-pending applications hereinabove referred to. As an example of the more spectacular result which can be obtained with use of the shortening of the present invention, we are describing herein a yellow cake which has already been described in Example 3 of our co-pending application Serial No. 726,174. The corresponding baked product made with the use of triglyceride shortening is a tough mass which could scarcely be called a cake at all, whereas the yellow cake prepared according to the accompanying directions is light and tender and highly palatable. The ingredients of this yellow cake are as follows:

| | Lbs. | Ozs. |
|---|---|---|
| Flour | 1 | 0 |
| Superglycerinated fat (see below) | | 7½ |
| Sugar | 1 | 2½ |
| Salt | | ½ |
| Baking powder | | 1 |
| Milk | 1 | 2½ |
| Whole eggs | | 12¼ |
| Vanilla | | ¼ |

A suitable superglycerinated fat for use in the above formula is obtained by reacting hydrogenated cottonseed oil of about 70 iodine value with glycerin, thereby producing a synthetic fat containing about 20% combined glycerin which comprises a considerable proportion of monoglyceride. The mixing and baking are carried out in a manner which is essentially conventional and which has been described in our co-pending application just referred to.

Having thus described the invention, what is claimed as new and desired to be secured by Letters Patent is:

1. A substantially dry shortening agent containing a plastic mixture of solid and liquid fat and suitable for use in doughs and batters, said shortening agent consisting principally of esters of predominantly unsaturated higher fatty acids, said esters having a molecular formula containing a glycerol radical having therein at least one unesterified hydroxyl group.

2. A substantially dry shortening agent containing a plastic mixture of solid and liquid fat and suitable for use in doughs and batters, said shortening agent consisting principally of glycerides selected from the group consisting of monoglycerides and diglycerides of predominantly unsaturated higher fatty acids.

3. A shortening capable of producing baked goods of increased tenderness when employed to replace ordinary triglyceride shortening in doughs and batters, consisting essentially of a plastic mixture of solid and liquid higher fatty acid esters of molecular formula containing a glycerol radical, esters of the type containing at least one unesterified glycerol hydroxyl group and derived from predominantly unsaturated higher fatty acids predominating in such mixture.

4. A shortening capable of producing baked goods of increased tenderness when employed to replace ordinary triglyceride shortening in doughs and batters, such shortening being of plastic consistency and consisting principally of a mixture of mono- and diglycerides of predominantly unsaturated higher fatty acids.

5. A shortening capable of producing baked goods of increased tenderness when employed to replace ordinary triglyceride shortening in doughs and batters, such shortening being of plastic consistency and consisting principally of a mixture of higher fatty acid mono- and diglycerides and incompletely esterified polyglycerides, said mixture being derived from predominantly unsaturated higher fatty acids.

6. A shortening agent suitable for use in doughs and batters, such agent consisting essentially of a plastic mixture of solid and liquid glycerides of higher fatty acids and containing predominantly glycerides selected from the group consisting of mono- and diglycerides of predominantly unsaturated higher fatty acids.

7. A substantially dry plastic shortening containing principally compounds of the group consisting of mono- and diglycerides of predominantly unsaturated higher fatty acids.

8. A shortening capable of producing baked goods of increased tenderness when employed to replace ordinary triglyceride shortening in doughs and batters, such shortening being of plastic consistency and consisting principally of a mixture of mono- and diglycerides of predominantly unsaturated higher fatty acids derived from partially hydrogenated fatty oil.

9. In the process of preparing cakes, biscuits, bread, rolls and like products of the culinary art, the step which comprises mixing into the dough or batter a plastic mixture of solid and liquid fat, said plastic mixture consisting principally of esters of predominantly unsaturated higher fatty acids, said esters having a molecular formula containing a glycerol radical having therein at least one unesterified hydroxyl group.

10. In the process of preparing cakes, biscuits, bread, rolls and like products of the culinary art, the step which comprises mixing into the dough or batter a plastic mixture of solid and liquid fat, said plastic mixture consisting principally of esters of predominantly unsaturated higher fatty acids, said esters being selected from the group consisting of mono- and diglycerides.

ALBERT S. RICHARDSON.
HERBERT S. COITH.
VERLING M. VOTAW.